United States Patent [19]

Nezuka

[11] 4,432,585
[45] Feb. 21, 1984

[54] EMERGENCY BRAKE SYSTEM

[75] Inventor: Kenjiro Nezuka, Kashiwa, Japan

[73] Assignee: Dresser Industries, Inc., Dallas, Tex.

[21] Appl. No.: 363,191

[22] Filed: Mar. 29, 1982

[51] Int. Cl.³ .............................................. B60T 7/02
[52] U.S. Cl. ..................................... 303/10; 303/13; 303/71; 188/170
[58] Field of Search .................. 303/10, 11, 71, 13, 303/6 M; 188/170

[56] References Cited

U.S. PATENT DOCUMENTS 3,479,096 11/1969 Cruse ..................................... 303/13
3,977,732 8/1976 Grosseau ............................... 303/13

Primary Examiner—Bruce H. Stoner, Jr.
Assistant Examiner—Alvin Oberley
Attorney, Agent, or Firm—Barry E. Deutsch

[57] ABSTRACT

A hydraulic emergency braking system for a vehicle also having service brakes wherein a hydraulic directional control valve provides input pressure to a dump valve having a pressure outlet to spring apply, pressure-release brake actuators and a dumping outlet to the hydraulic reservoir. Internal conduits in the dump valve housing assure continuous transmission of inlet pressure to the pressure outlet thereby releasing the pressure-release brakes, while preventing reverse flow with a check valve when the directional control valve dumps the inlet pressure to the reservoir to apply the brakes. In the absence of inlet pressure to the dump valve, a spring-biased spool valve connects the pressure outlet to the dumping outlet, thereby immediately dropping the pressure in the brake actuators to the value predetermined by the spring. Orifices in the brake actuators then allow the pressure to gradually decay down to a point whereat nearly full braking force is applied, at which point the valve spool stops moving causing the pressure in the actuator to drop to zero giving full braking force.

8 Claims, 1 Drawing Figure

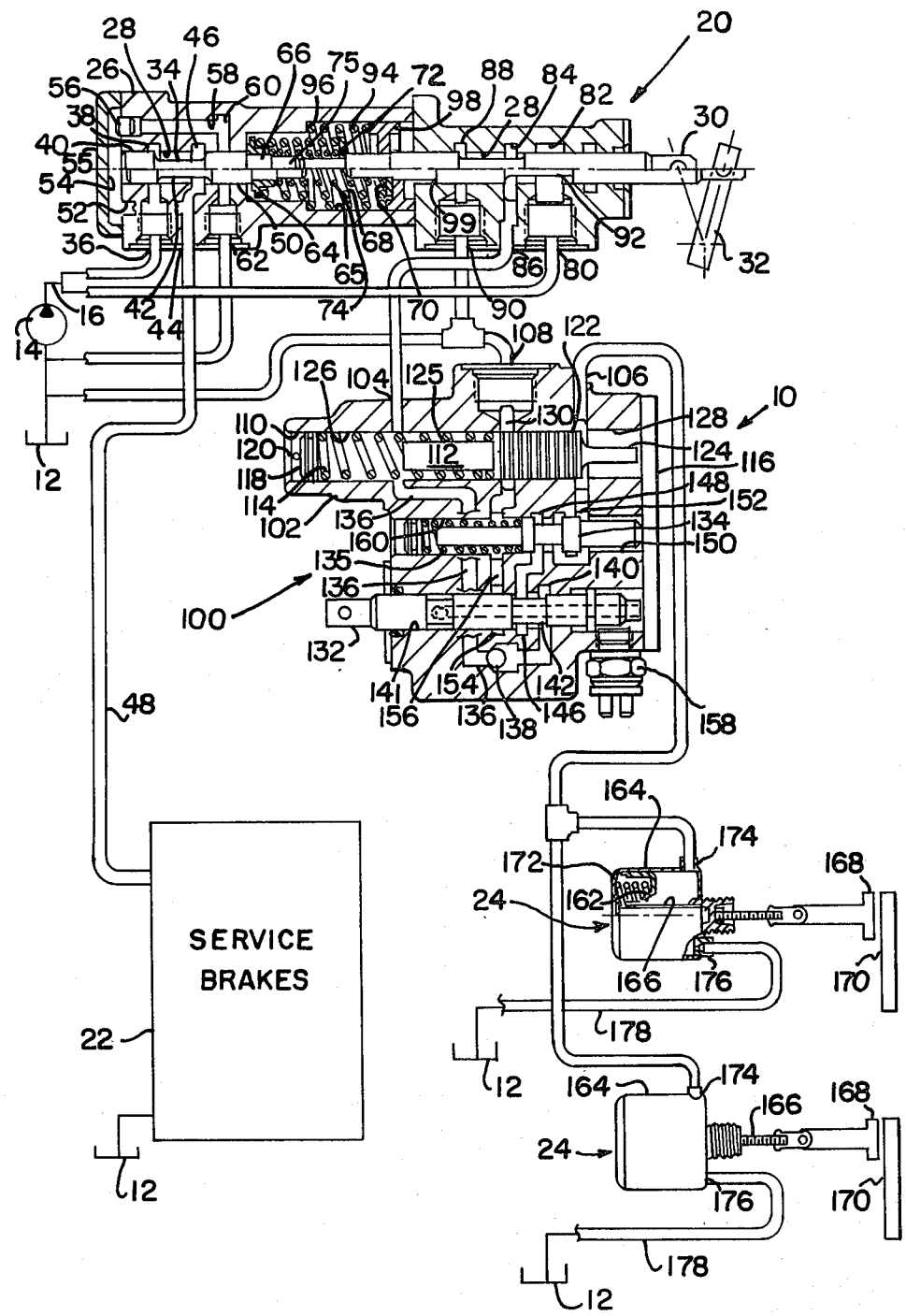

EMERGENCY BRAKE SYSTEM

CROSS-REFERENCE TO RELATED APPLICATION

This application is related to application Ser. No. 363,192 filed by Kenneth E. Houtz concurrently herewith and assigned to the assignee hereof.

BACKGROUND OF THE INVENTION

This invention is related to emergency braking systems for vehicles, especially heavy work vehicles, of the type having emergency brakes in addition to the service brakes used for normal operation and, more particularly, to a hydraulic control system for the emergency brakes which provides a smooth yet complete engagement thereof.

It is known to provide vehicles with spring-apply, pressure-release service brakes, for example on highway trucks. Such brakes would also appear to be extremely useful in separate emergency braking systems in vehicles due to their fail-safe nature, since they mechanically engage in the absence of release pressure, and since they may also be used as parking brakes when the engine is not running and may have been so used especially for the latter purpose. However, unlike service brakes, emergency brakes are rarely applied gradually. Rather, the vehicle operator is usually reacting to an emergency situation and suddenly jams them on. Alternatively, the brakes might be applied automatically if hydraulic pressure were suddenly lost in the vehicle. The sudden application of full braking force is undesirable from a operator comfort and safety standpoint. At the same time, the load must be applied quickly and completely under emergency conditions.

SUMMARY OF THE INVENTION

Accordingly, it is the primary object of the invention described and claimed herein to provide an emergency braking system which immediately begins braking upon actuation of the control therefor but which applies most of the braking load gradually, albeit over a fairly short interval.

This object and others as will become apparent is specifically met in a hydraulic emergency braking system for a vehicle also having service brakes wherein a hydraulic directional control valve provides input pressure to a dump valve having a pressure outlet to spring apply, pressure-release brake actuators and a dumping outlet to the hydraulic reservoir. Internal conduits in the dump valve housing assure continuous transmission of inlet pressure to the pressure outlet thereby releasing the pressure-release brakes, while preventing reverse flow with a check valve when the directional control valve dumps the inlet pressure to the reservoir to apply the brakes. In the absence of inlet pressure to the dump valve, a spring-biased spool valve connects the pressure outlet to the dumping outlet, thereby immediately dropping the pressure in the brake actuators to the value predetermined by the spring. Orifices in the brake actuators then allow the pressure to gradually decay down to a point whereat nearly full braking force is applied, at which point the valve spool stops moving causing the pressure in the actuator to drop to zero giving full braking force.

DETAIL DESCRIPTION OF THE DRAWING

Other objects and advantages will become more apparent upon reading the following Description of the Preferred Embodiment and upon perusal of the drawing which is a schematic representation of a vehicle hydraulic braking circuit.

DESCRIPTION OF THE PREFERRED EMBODIMENT

Referring now to the drawing, there is shown schematically a hydraulically operated braking system 10 for a vehicle, such as a heavy work vehicle, including a hydraulic fluid reservoir 12, a hydraulic pump 14 drawing fluid from the reservoir and delivering it to conduit 16 at a regulated pressure, hereinafter referred to as system pressure, sufficiently high to fully actuate the service brakes or release the emergency brakes as the case may be. It will be appreciated that the output of the hydraulic pump 14 may also be used for other purposes than braking which are not taught or illustrated herein.

Hydraulic fluid at system pressure is delivered to two separate inlet ports of brake pilot valve 20 which controls both the pressure apply vehicle service brakes, schematically shown at 22, and the emergency or parking brake actuators 24 to be described more completely hereinafter.

The brake pilot valve 20 includes a housing 26 having a central bore 28 which slidably receives a control stem 30, the stem being illustrated in the drawing in the extreme positions of travel on opposite sides of the center line, having one end operatively connected by linkage, a portion thereof being shown at 32, to a conventional foot pedal (not shown) in the operator's compartment of the vehicle. Also within the central bore 28 in axial alignment with the control stem 30 is valve spool 34 which controls the application of the service brakes 22. To this end, the pilot valve housing 26 is provided with an inlet port 36 connected to the hydraulic pump 14, which intersects an annulus 38 formed in the central bore 28 near the left end thereof. A land 40 on the valve spool 34 acts in cooperation with the edge of the annulus 38 to throttle the inlet fluid into the annular groove 42 of the spool, thereby reducing its pressure, for delivery to outlet port 44, also intersecting the central bore 28 at annulus 46 and then through the conduit 48 connected to the outlet port and leading to the service brakes 22 which have a flow-restricted outlet permitting a small amount of flow back to the reservoir 12.

A second land 50 on the valve spool 34 fits in the central bore 28 to the right of the output annulus 46 and seals off the pressure annulus 46 from the spring cavity 65 of the valve housing 26. An internal conduit 52 in the valve housing conducts the output pressure from the output annulus 46 to a chamber 54 formed on the end of the valve housing 26 by a cap 55 and exposed to the end of the valve spool thereby eliminating any pressure differential across the land 40. Outlet pressure is further conducted and reduced through a small orifice 56 and internal conduit 58 to annulus 60 disposed about the valve spool land 50 to pick up leakage and then out port 62 and back to the reservoir 12. The above arrangement assures a small amount of continuous flow through the pilot valve passages to prevent the hydraulic fluid from congealing in cold operating conditions.

A land 64 of slightly smaller diameter than the land 50 is formed on the valve spool 34 adjacent the two and extends into the cavity 65 existing in the housing 26 between the stem 30 and spool 34 whereat it receives an annular spring retainer 66 which abuts against the end of the land 50. A brake pressure control spring 68 is seated on the spring retainer 66 and extends axially of the valve spool 34 and control stem 30 to an annular spring retainer washer 70 mounted on the control stem 30, its axial position there being fixed by shoulder 72 on the stem and a snap ring. In addition to the brake pressure spring 68, an inner low pressure spring 74 also extends axially between the retainer washer 70 on the control stem 30 and the shoulder formed by the end of the small land 64 and the end stem 75 on the valve spool 34.

The operation of the service brake end of the brake pilot valve 20 is as follows. With the hydraulic pump 14 presenting system pressure to the inlet 36 and the control stem 30 in its rightmost position, corresponding to the operator not touching the brake pedal, only the inner spring 74 is exerting a force on the spool 34, the brake pressure spring 68 being in a free length state. Since the pressure on the land 40 of the spool is the same on both sides, the spring 74 pushes the spool leftward in the bore 28 allowing fluid to throttle past the edge of the land 40 into the output annulus 46. An equilibrium position is reached when the force on the left side of land 50 due to the outlet pressure equals the force imposed on the spool by the spring 74. The low pressure caused by spring 74 insures a small amount of flow through both the pilot valve 20 and the service brakes 22 back to the reservoir 12 to keep the system warm and ready to respond, the pressure regulated by the spring 74 being insufficient to actuate the service brakes 22. Upon the operator depressing the brake pedal (not shown) and moving the control stem 30 to the left, the pressure spring 68 becomes compressed by the retainer washer 70 proportionate to the degree of travel of the control stem and brake pedal. The inner spring 74 is also compressed. Accordingly, the valve spool 34 moves to the left reducing the throttling past the land 40 and therefore increasing the outlet pressure until equilibrium is again reached with the outlet pressure to the service brakes 22 acting against the land 50 and balancing the springs 68 and 74. Thus, service braking proportional to the operator's actuation of the brake pedal occurs until full system pressure is introduced to the service brakes 22.

The right end of the brake pilot valve 20 constitutes the emergency braking control valve. To this end, the valve housing 26 has a second pressure inlet 80 exposed to system pressure from the hydraulic pump 14, which inlet intersects the central bore 28 in an input annulus 82. Adjacent the input annulus 82, the central bore 28 is provided with a pressure output annulus 84 leading to pressure outlet port 86 for supplying pressure to release the pressure-release, spring-apply emergency brake actuators 24. A dumping annulus 88 is provided in the bore 28 adjacent the pressure annulus 84 on the side opposite the input annulus 82, dumping annulus 88 being connected through dump outlet 90 and suitable conduits to the hydraulic reservoir 12. The control stem 30, which slideably fits in the bore 28 in hydraulic sealing relation, is provided with an annular groove 92 positioned to permit continuous communication between the pressure input annulus 82 and the pressure outlet annulus 84 when the control stem is in its rightmost position, the groove 92 having sufficient axial length relative to the spacing of the annuli 82, 84 to maintain the communication therebetween during all of the positions of the control stem 30 corresponding to normal operation of the service brakes of the vehicle as explained above. The dumping annulus 88 is positioned in the bore 28 such that when the stem 30 moves to the left and closes off the input annulus 82 from the groove 92, communication between the pressure outlet annulus 84 and the dumping outlet annulus 88 is then achieved through the groove 92. Thus, the right end of the brake pilot valve 20 functions as an on-off directional control valve which continuously provides pressure to the pressure-release emergency brake system when the control stem is not actuated, or is only actuated for normal braking operations, but which dumps the pressure in the pressure outlet 86 back to the reservoir 12 when the control stem 30 is moved leftwardly beyond the normal braking range of travel thus causing the emergency brakes to be applied at the same time and with the same pedal control as the service brakes 22.

To give the operator a tactile warning that his emergency brakes are about to be applied, an additional compression spring 94 is disposed in the valve housing 26 being seated against an internal shoulder 96 in the cavity 65 which engages a spring retainer 98 slideably mounted on the control stem 30 but normally engaging the axial end wall of the interior cavity 65. The control stem 30 is provided with a shoulder 99 disposed to engage the spring retainer 98 as the control stem moves leftwardly just before communication between the input annulus 82 and pressure outlet annulus 84 is broken. At this point, the pedal force is increased by at least 50 percent, immediately warning the operator of the impending engagement of the emergency brakes.

The dump valve assembly 100 comprises a housing 102 having a pressure inlet port 104 communicating with the pressure outlet 86 of the pilot valve 20, a pressure outlet port 106 communicating with the brake actuators 24, and a dump outlet 108 communicating with the hydraulic reservoir 12. The dump valve housing 102 further includes a first dumping and accumulating bore 110 containing a sliding valve spool 112 biased by regulating spring 114 on the left end of the spool 112 toward engagement with the right end of the bore which is sealed by end plate 116. The spring 114 is preloaded by plug 118 which also seals the left end of the bore 110 being retained therein as by roll pin 120. The valve spool 112 has a relatively wide land 122, an elongated stem 124 on the right end for engaging the end plate 116, and an elongated stem 125 on the left end for piloting the spring 114 and for stopping the spool against plug 118. The input port 104 intersects the valve bore 110 in the spring cavity 126 and is continuously open thereto. The pressure outlet port 106 intersects the bore 110 in the pressure cavity 128 at the right end of the spool and is continuously open since the elongated stem 124 on the spool 112 prevents the land 122 from closing it. The dump outlet 108 also intersects the bore 110 in an annulus 130 normally closed off from the bore 110 by the spool land 122.

An internal conduit means in the valve housing 102 provides a continuous flow path during normal operation of the vehicle from the spring cavity 126 to the pressure cavity 128 so long as the input port 104 is pressurized, the conduit means having a reverse flow preventing means. The conduit means which is more elaborate in the drawing due to the parking switch spool 132 and the pressure reducing spool 134, comprises an internal passage 136 intersecting the bore 110 at the spring cavity 126 and extending downwardly to a reverse flow check valve 138 and then to annulus 140 of parking switch bore 141 containing the spool 132. With the parking switch in the operating position, fluid is transferred through groove 142 on the spool 132 to annulus 146 which communicates with annulus 148 in the pressure reducing bore 150 containing pressure reducing valve spool 134 which is baised by spring 135 to permit the flow from its output annulus 152 at a lower pressure than system pressure corresponding to the maximum pressure limits of the brake actuators 24. The output annulus 152 of the pressure reducing valve opens to the pressure cavity 128.

It can be seen that the parking switch bore 141 is provided with a second annulus 154 communicating through internal conduit 156 in the housing 102 with the dump outlet 108. Thus if the parking spool 132 is moved to the left, the annuli 146, 154 communicate through the spool groove 142 and all pressure to the brake actuators is relieved thereby maintaining the brakes 24 in a locked condition for parking whether or not the vehicle engine and pump are operating. The parking spool is operated manually and an electrical detent switch 158 interacts with the end of the spool to warn the operator that he is in the parking switch-off condition. It can also be seen that the spring cavity 160 of the pressure reducing spool 134 also communicates through the conduit 156 to the dump outlet 108 and reservoir 12. Thus, the pressure in the output annulus 152 of the pressure reducing valve directly corresponds to the load imposed by the spring 135.

The spring-apply, pressure-release emergency brake actuators 24 are a commercially available brake cannister commonly used in highway truck air brake systems, although used with hydraulic fluid here, which comprise a piston 162 slideably mounted in a housing 164 sealed at one end to form a hydraulic cylinder and ventilated at the other. A central rod 166 extends axially from a connection with the piston 162 through bottom of the sealed side of the housing and through suitable seals therein to a disc brake pad 168 positioned to engage a disc 170 mounted against rotation to the vehicle wheel (not shown). A heavy compression spring 172 is disposed on the ventilated side of the piston 162. In the absence of hydraulic pressure at the inlet 174 to the hydraulic cylinder side of the housing which is connected in parallel with the inlet 174 of the other brake actuator 24 to the pressure outlet 106 of the dump valve, the springs 172 provide the complete force engaging the brake pad 168 and the disc 170. Each housing is also provided on its hydraulic side with a flow restricted outlet in the form of a fixed orifice 176 which is connected by conduit 178 to the hydraulic reservoir 12.

In operation, when the control stem 30 is in the normal rightmost position or in the normal braking range of travel as described above, system pressure is supplied to the inlet 104 of dump valve 100 forcing the spool to the right against its stop, the pressure cavity 128 being at a lower pressure, and the system pressure is communicated through the conduit means 136, past the check valve 138, through the parking switch annuluses 140, 146, through the pressure reducing valve 134 and outlet annulus 152 to the pressure cavity 128 and then out the pressure outlet 106 to the brake actuators 24 whereat the pistons are forced to be left against and overcoming the actuating springs 172 thereby pulling the brake pads 168 away from the discs 170. Since pressure is continuously available, the orifice 176 have no effect except to maintain a constant small flow through the system keeping the fluid from congealing in cold conditions, the latter being the primary reason for the specific location of the orifices 176 in the brake housings. Otherwise they could be anywhere on the pressure cavity side downstream of check valve 138.

When the operator depresses his brake pedal beyond the normal braking travel, the pressure in the inlet port 104 of the dump valve 100 is vented to the reservoir 12 through the pilot valve outlet 90. Since the pressure in the pressure cavity 128 immediately exceeds the pressure in the spring cavity 126 which is now zero, check valve 138 closes and the spool 112 is forced to the left overcoming spring 114 and opening the annulus 130 and dump port 108 to the pressure cavity 128, thereby immediately dropping the pressure therein to the value determined by the spring 114. This is ideally slightly lower than that at which the brake apply springs 172 overcome the piston 162 to the extent of taking up the clearance and actually begin engaging the brake pads 168 and discs 170. When this predetermined pressure is reached, the spring 114 moves the valve spool 112 to the right closing off the dumping annulus 130. Then, the pressure in the pressure cavity 128 and the brake actuators 24 begins to gradually decay as fluid returns to the reservoir 12 through the orifices 176 in the brake actuators 24. The rate of decay is also influenced by the spring 114 forcing the valve spool 112 toward the end plate 116 and causing a reduction of volume of the pressure cavity 128 as well as by the orifice size. This gradual pressure decay provides a corresponding gradual increase in the amount of braking force applied by the springs 172 to brake discs and wheels. When the stem 124 of the valve spool contacts the end plate 116, there is no more corresponding reduction in system volume to correspond to the volume of fluid escaping through the orifices 176 (the brake canister pistons 162 being almost motionless after engagement of the pad and disc) and the pressure drops to zero with the emergency brakes totally engaged.

Although the foregoing seems to be a long time to get the brakes engaged in an emergency situation, with proper sizing the above sequence can occur in about one to one and a half seconds or less without undue shock loads being imposed on the operator. Moreover, since the operator has but to apply more pressure to his service brake pedal to engage the emergency brakes, his reaction time in activating the emergency brakes should be substantially reduced compared to the time to locate and activate some other emergency braking device.

Thus, there has been described in accordance with the invention an emergency braking system which fully meets the objects, aims and advantages set forth above. While the invention has been described in connection with a preferred embodiment thereof, it will be apparent to those of ordinary skill in the art that several alternatives and modifications can be made without departing from the true scope of the invention. Accordingly, it is decided to claim all such alternatives and modifications as fall within the spirit of the appended claims.

What is claimed is:

1. In combination with a vehicle, said vehicle having service brakes and emergency brakes, a hydraulic control system for said emergency brakes comprising:
   a hydraulic fluid reservoir;
   a source of hydraulic pressure connected to said hydraulic reservoir for drawing fluid therefrom;
   a directional control valve connected to said source of hydraulic pressure and having a system pressure outlet, said control valve having a normal position communicating said hydraulic pressure to said system pressure outlet and an operator selected position venting said system pressure outlet to said reservoir;

a dump valve including a housing having an axially sealed bore, an inlet port connected to said control valve outlet and intersecting one end of said bore, a conduit means for communicating fluid pressure from said one end of said bore to the other end of said bore, means for preventing reverse flow in said conduit means toward said one end of said bore, a brake actuator pressure outlet port intersecting said bore at said other end of the valve bore, and a dump outlet port intersecting said bore between said inlet port and said brake actuator pressure outlet port, said dump valve further having a valve spool slideably fit in said bore and a spring biasing said spool toward said other end, said spool having a land positioned thereon such that upon pressure being supplied to the inlet port, said dump outlet port is closed and fluid is communicated to the outlet port through said conduit means, and, in the absence of pressure in said inlet port, communication is established between said brake actuator pressure outlet and said dump outlet but only so long as the pressure in said brake actuator pressure outlet is sufficient to overcome said spring bias on said valve spool;

a spring-apply, pressure-release brake actuator, said actuator comprising an expansible chamber hydraulic motor for releasing said brake, said chamber having an inlet port hydraulically connected with said dump valve brake actuator pressure outlet; and a flow restricted outlet communicating with said reservoir disposed to gradually relieve fluid pressure applied to said brake actuator.

2. The invention in accordance with claim 1 and a second identical brake actuator connected in parallel with said first brake actuator to said dump valve brake actuator pressure outlet.

3. The invention in accordance with claim 1 or claim 2 and said flow restricted outlet comprising a fixed orifice in said brake actuator.

4. The invention in accordance with claim 1 and said means preventing reverse flow in said dump valve conduit means comprising a check valve.

5. The invention in accordance with claim 4 and said dump valve conduit means further including hydraulic manual switching means for selectively short circuiting said inlet port to said dump outlet port.

6. The invention in accordance with claim 4 or claim 5 and said dump valve having a pressure reducing means disposed in said conduit means between said one end of said bore and the other end.

7. The invention in accordance with claim 1 and said dump valve spool having a stop means contacting said other end of said bore at a predetermined point whereby the pressure on said brake actuator drops to zero.

8. A hydraulic control system for emergency brakes comprising:
a hydraulic reservoir,
a hydraulic pump drawing fluid from said reservoir,
a pilot control valve connected to said hydraulic pump and to said hydraulic reservoir and having a system pressure outlet, said control valve having a first normal position connecting said hydraulic pump to said system pressure outlet and a second selective position connecting said outlet to said reservoir;
a dump valve connected to said pilot valve system pressure outlet having a conduit means communicating inlet pressure to a pressure cavity, said conduit means having a reverse flow check valve, and a valve means inactive in the presence of inlet pressure but, in the absence of inlet pressure, disposed to permit communication between said pressure cavity and a dumping outlet open to said reservoir, said valve means being spring biased to permit communication only above a predetermined pressure differential between said pressure cavity and said dumping outlet;
a pressure-release, mechanical-apply brake actuator having an inlet communicating with said dump valve pressure cavity and
flow restrictive outlet means communicating with the fluid pressure applied to said brake actuator to permit gradual decay of said pressure in the absence of inlet pressure to said dump valve and in the absence of communication between said dump valve pressure cavity and said dump outlet.

* * * * *